United States Patent Office 3,551,488
Patented Dec. 29, 1970

3,551,488
PROCESS FOR PREPARING DICYCLOHEXYLAMINE
Bernard R. Bluestein, Glen Rock, and Jack M. Solomon, West Caldwell, N.J., assignors to Witco Chemical Company, Inc., New York, N.Y., a corporation of Delaware
No Drawing. Filed June 6, 1968, Ser. No. 734,896
Int. Cl. C07c *85/06, 85/08*
U.S. Cl. 260—563                                    5 Claims

ABSTRACT OF THE DISCLOSURE

Process of preparing dicyclohexylamine from cyclohexanol or cyclohexanone, or mixtures of cyclohexanol and cyclohexanone, by passing the same together with ammonia and hydrogen, in the vapor phase at atmospheric pressure, over a heated two-component catalyst in the form of a layer of copper chromite above a layer of nickel, or an admixture of copper chromite and nickel, on an inert carrier such as kieselguhr.

---

Our invention is directed to an improved process for preparing dicyclohexylamine from cyclohexanol or cyclohexanone, or from mixtures thereof.

Processes for the preparation of dicyclohexylamine from cyclohexanol or cyclohexanone, broadly speaking, have long been known and have been disclosed in various patents and other publications. In certain instances, the known processes have involved contacting cyclohexanone in admixture with cyclohexylamine, at superatmospheric pressure, with hydrogen and with a palladium or platinum (or the oxides thereof) catalyst at temperatures up to about 212° F. In other processes, cyclohexanol, in admixture with ammonia and hydrogen has been passed into contact with a foraminate nickel/aluminum catalyst, at temperatures of the order of 390° F., under superatmospheric conditions, e.g., 17 atmospheres gauge. These, and other processes, for the production of dicyclohexylamine, are shown in U.S. Pat. Nos. 1,982,985; 2,636,902; 3,154,580; 3,219,704 and 3,239,562. In general, such known procedures possess one or more disadvantages in that they require the utilization of substantial superatmospheric pressures; or they require the use of relatively expensive catalysts; or they require quite long reaction times; or they produce low yields of dicyclohexylamine or poor selectivity and high proportions of undesired byproducts.

The process of our present invention has a number of advantages in that it produces excellent yields of dicyclohexylamine from cyclohexanol or cyclohexanone, or mixtures thereof such as are produced by the oxidation of cyclohexane in the liquid phase by well known procedures without the necessity of effecting separation of the cyclohexanol and cyclohexanone from each other. In addition, our process is carried out at atmospheric or substantially atmospheric pressure. The catalyst which is utilized, which is a two component system consisting of one layer of copper chromite above a layer of nickel on an inert carrier, or an admixture of the aforesaid catalysts, is readily prepared and is economical in cost and produces high yields of dicyclohexylamine with good selectivity and low amounts of byproducts at relatively low temperatures.

As stated above, cyclohexanol or cyclohexanone, or mixtures thereof, can be used as the starting material or feedstock. Where mixtures are used, it is desirable to employ such mixtures as commonly result from the oxidation, for instance, the molecular oxygen, such as air, oxidation of cyclohexane in the liquid phase, as shown, for instance in U.S. Pat. Nos. 2,223,494 and 2,557,281. The unreacted cyclohexane and other byproducts are removed by known procedures and the cyclohexanol-cyclohexanone mixtures commonly contain approximately 55% cyclohexanol and about 45% cyclohexanone. Such mixtures, as so produced, provide an excellent starting material or feedstock for our process. However, mixtures, generally, of cyclohexanol and cyclohexanone can be used as well as substantially pure cyclohexanol or cyclohexanone.

The two component copper chromite-nickel on an inert carrier catalyst can be prepared in various ways and with variable contents of copper chromite and of nickel. Thus, the copper chromite content may range from 10 to 75% and the nickel content may range from 90 to 25%, particularly desirable being about 40% copper chromite and about 60% nickel. The said catalyst is carried on an inert support as, for example, kieselguhr, gamma alumina, pumice, asbestos and silica gel. Particularly preferred is kieselguhr. One illustrative procedure for producing a suitable copper chromite-nickel catalyst is as follows:

Equimolar quantities of copper nitrate (or other easily decomposable copper salts) and chromic acid are dissolved in a minimum amount of distilled water, to which is added 30% by weight of kieselguhr. The mixture is stirred and heated to dryness and the powder residue is shaped into ⅛″ tablets and calcined in the presence of air at 600° F. for 2 to 4 hours. This results in the production of the copper chromite on kieselguhr. The nickel is produced similarly, that is, nickel nitrate is dissolved in a minimum amount of distilled water and 42% by weight of kieselguhr is added, the mixture is stirred, heated to dryness, the powder residue shaped and calcined in air at about 600° F. for 2 to 4 hours. Approximately equal quantities of the copper chromite on kieselguhr tablets and the nickel on kieselguhr tablets are arranged in layers to provide the copper chromite over nickel catalyst. The layered catalyst system as described herein is most suitable and preferable for the practice of the present invention, but it is also suitable to thoroughly intermix the components of the catalyst system.

The molar ratios of the ammonia and of the hydrogen to the cyclohexanol and/or cyclohexanone utilized in the reaction are variable.

In the case of the molar ratios of the ammonia to the cyclohexanol and/or cyclohexanone, a molar ratio of about 0.4 to 1 of the ammonia to 1 of the cyclohexanol and/or cyclohexanone is utilized with a molar ratio of about 0.5 to 0.7 of the ammonia to 1 of the cyclohexanol and/or cyclohexanone being particularly desirable.

In the case of the molar ratios of the hydrogen to the cyclohexanol and/or cyclohexanone, a molar ratio of about 1.5:1 results in the production of approximately equal proportions of monocyclohexylamine and dicyclohexylamine. Molar ratios less than 1.5:1 produce dicyclohexylamine as the predominant product of the reaction. It is particularly advantageous to use molar ratios of about 0.5 to 0.7 of the hydrogen to 1 of the cyclohexanol and/or cyclohexanone.

The contact times between the reaction mixture and the catalyst are variable but, in general, are of short duration, generally in the range of 1 to 30 seconds. In most cases, contact times of from about 5 to 15 seconds are satisfactory, with about 10 seconds being particularly desirable, depending, however, on the specific activity of the catalyst and the temperature at which the reaction is carried out. Reaction temperatures will, in the usual case, range from about 375 to 525° F., advantageously from about 400 to 500° F. with about 500° F. being substantially optimum in most cases. Unreacted material can, of course, be recycled.

The following examples are illustrative of the practice of the process of our invention but are not to be construed in any way as limitative thereof since various changes may be made in the light of the guiding principles and teachings contained herein.

EXAMPLE 1

A mixture of cyclohexanol and cyclohexanone, containing about 55% cyclohexanol and about 45% cyclohexanone, is vaporized and admixed with gaseous ammonia and hydrogen (in molar ratios of (a) 0.5 of the ammonia to 1 of the cyclohexanol-cyclohexanone mixture and (b) 0.7 of the hydrogen to 1 of said cyclohexanol-cyclohexanone mixture) and passed at atmospheric pressure into contact with a two component catalyst system consisting of one layer of copper chromite (CuO 42%+$Cr_2O_3$ 38%) above a layer of nickel catalyst (58% nickel on kieselguhr) at a temperature of about 500° F. for a period of 15 seconds. A yield of about 70% dicyclohexylamine based on the amount of conversion is obtained.

EXAMPLE 2

The process described in Example 1 is carried out except that the feedstock is cyclohexanone, the molar ratios of the ammonia and hydrogen to the cyclohexanone are, respectively, 0.6:1 and 1:1, and the reaction temperature is about 475–485° F., and the contact time is about 18 seconds. A high yield of dicyclohexylamine is obtained.

What is claimed is:

1. A process for the preparation of dicyclohexylamine which comprises passing a member selected from the group consisting of cyclohexanol, cyclohexanone and mixtures thereof, together with ammonia and hydrogen, in the vapor phase at substantially atmospheric pressure, over a heated two-component catalyst in the form of copper chromite and nickel on an inert carrier, said catalyst containing from 10 to 75% copper chromite and 90 to 25% nickel, said reaction being carried out at a reaction temperature of 375 to 525° F., the molar ratio of the ammonia to the cyclohexanol, cyclohexanone and mixtures thereof being from about 0.4:1, and the molar ratio of the hydrogen to the cyclohexanol, cyclohexanone and mixtures thereof being not more than about 1.5:1, the contact time of the reaction mixture with the catalyst being from 1 to 30 seconds.

2. The process of claim 1, in which said two-component catalyst is in the form of a layer of copper chromite above a layer of nickel on an inert carrier.

3. The process of claim 2, in which the copper chromite catalyst contains about 42% CuO and about 38% $Cr_2O_3$, and in which the content of nickel in the nickel on inert carrier catalyst is about 58%.

4. The process of claim 2, in which the copper chromite catalyst contains about 42% CuO and about 38% $Cr_2O_3$.

5. The process of claim 4, in which the inert carrier is kieselguhr and the content of the nickel is about 58%.

References Cited

FOREIGN PATENTS 1,492,098   7/1967   France _____ 260—563

CHARLES B. PARKER, Primary Examiner

D. R. PHILLIPS, Assistant Examiner